(12) United States Patent
Hodza et al.

(10) Patent No.: US 8,419,322 B2
(45) Date of Patent: Apr. 16, 2013

(54) ROTATING CUTTING TOOL WITH SUPPORT ELEMENT

(75) Inventors: Erkan Hodza, Asperg (DE); Henry Schuett, Sachsenheim (DE); Uwe Kretzschmann, Besigheim (DE)

(73) Assignee: Komet Group GmbH, Besigheim (DE)

( * ) Notice: Subject to any disclaimer, the term of this patent is extended or adjusted under 35 U.S.C. 154(b) by 288 days.

(21) Appl. No.: 12/737,516

(22) PCT Filed: Jul. 24, 2009

(86) PCT No.: PCT/EP2009/059550
§ 371 (c)(1),
(2), (4) Date: Jan. 20, 2011

(87) PCT Pub. No.: WO2010/015530
PCT Pub. Date: Feb. 11, 2010

(65) Prior Publication Data
US 2011/0116877 A1   May 19, 2011

(30) Foreign Application Priority Data
Aug. 7, 2008 (DE) .......................... 10 2008 036 726

(51) Int. Cl.
*B23B 27/16* (2006.01)
*B23B 47/00* (2006.01)

(52) U.S. Cl.
USPC .............................. 408/227; 407/113; 407/30

(58) Field of Classification Search .................... 407/30, 407/33, 113, 114, 115, 116; 408/223, 224, 408/227
See application file for complete search history.

(56) References Cited

U.S. PATENT DOCUMENTS 5,425,604 A * 6/1995 Scheer et al. ................... 408/83
6,872,035 B2   3/2005 Kress et al.
(Continued)

FOREIGN PATENT DOCUMENTS

DE  100 40 612 A1  2/2002
DE  101 38 945 A1  2/2003
(Continued)

OTHER PUBLICATIONS

Search Report of German Patent Office dated Jun. 25, 2009 (4 pages) with English translation of p. 2.
(Continued)

*Primary Examiner* — Will Fridie, Jr.
(74) *Attorney, Agent, or Firm* — Flynn, Thiel, Boutell & Tanis, P.C.

(57) ABSTRACT

The invention relates to a rotating cutting tool, in particular a boring tool for use in machine tools. The cutting tool comprises at least one cutting insert, designed as an indexable insert, that has an active main blade located near a corner of the insert, the outer end of said blade defining a circular flight path radius (R) as the blade rotates, said blade penetrating into a work piece at a pre-determined cutting depth (t) near a pre-formed round hole. Also provided is a secondary blade that is disposed opposite to an advancing direction and that aligns with the outermost end of the main blade, the entire length of said blade having a smaller radius than the circular flight path radius (R) of the main blade, wherein a secondary blade free surface aligns with the secondary blade opposite to the direction of rotation. A unique characteristic of the invention is that the secondary blade free surface comprises a support part disposed at a distance from the secondary blade, the peripheral radius of said part being larger than the circular flight path radius R of the active main blade by an overshoot amount (Y).

12 Claims, 8 Drawing Sheets

U.S. PATENT DOCUMENTS

| | | | |
|---|---|---|---|
| 6,901,642 B2 * | 6/2005 | Rydberg | 29/27 C |
| 6,974,280 B2 * | 12/2005 | Satran et al. | 407/42 |
| 7,237,985 B2 * | 7/2007 | Leuze et al. | 408/227 |
| 7,575,400 B2 * | 8/2009 | Kruszynski et al. | 408/57 |
| 2003/0039521 A1 | 2/2003 | Kress et al. | |
| 2003/0180109 A1 | 9/2003 | Leuze et al. | |
| 2006/0110227 A1 | 5/2006 | Kruszynski et al. | |
| 2012/0315099 A1 * | 12/2012 | Sjoo | 408/26 |

FOREIGN PATENT DOCUMENTS

| | | |
|---|---|---|
| DE | 10 2006 060 664 A1 | 6/2008 |
| EP | 0 586 423 | 3/1994 |
| EP | 1 281 466 A1 | 2/2003 |
| WO | WO 02/14003 A1 | 2/2002 |
| WO | WO 2004/024381 A2 | 3/2004 |
| WO | WO 2004/024381 A3 | 3/2004 |

OTHER PUBLICATIONS

Form PCT/ISA/237 dated Nov. 18, 2009 (5 pages).
Form PCT/ISA/210 dated Nov. 18, 2009 (4 pages) with English translation of categories of documents cited.

* cited by examiner

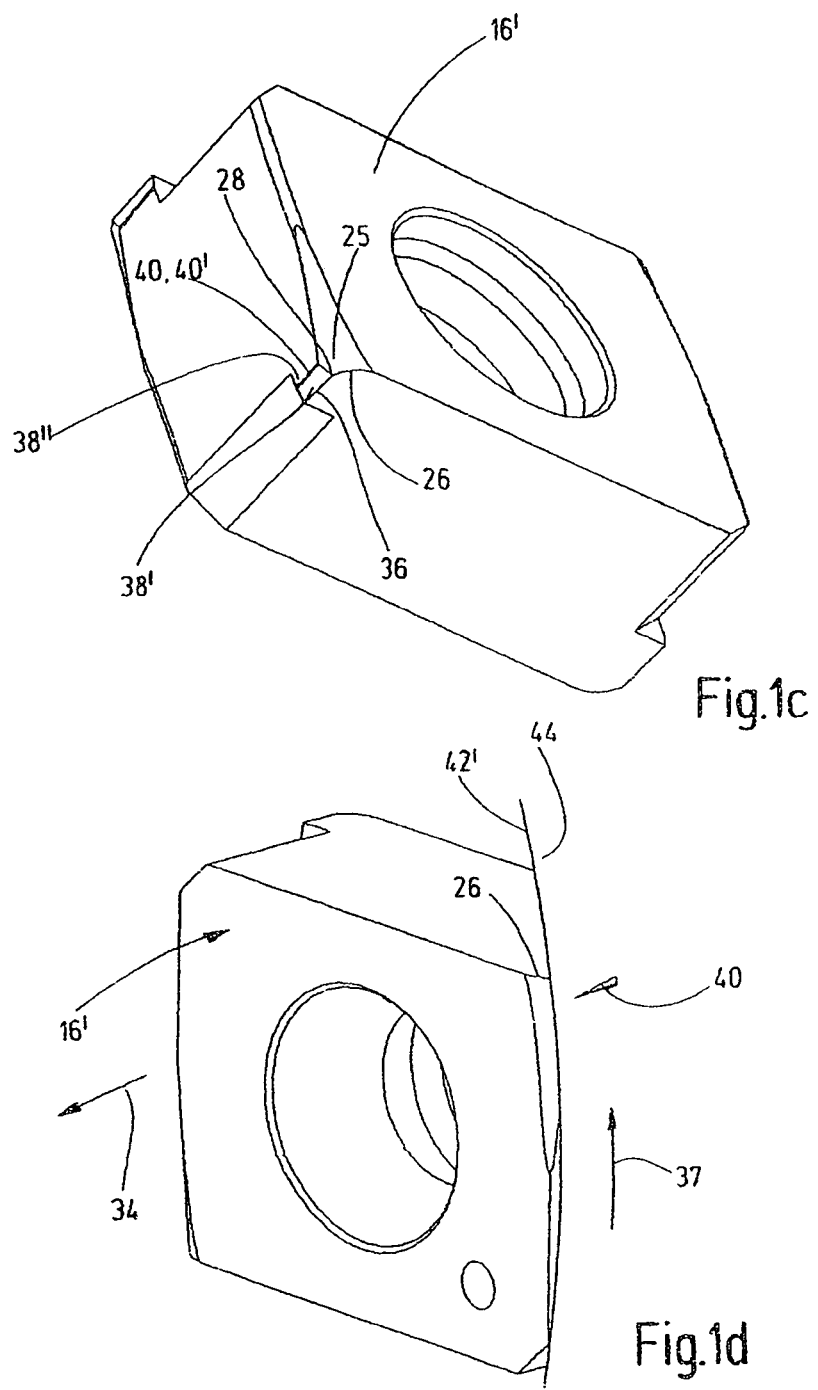

ROTATING CUTTING TOOL WITH SUPPORT ELEMENT

The invention relates to a rotating cutting tool, in particular a boring tool, for use in machine tools, comprising at least one cutting insert preferably designed as an indexable cutting insert, comprising an active major cutting edge which is arranged in the region of an insert corner of the cutting insert, defines a pitch circle radius at its outermost end during rotary use and penetrates with a predetermined cutting depth into a workpiece in the region of a preformed round hole concentrically to the latter, comprising a minor cutting edge which adjoins the outermost end of the major cutting edge against a feed direction and is arranged over its entire length on a smaller radius than the pitch circle radius of the major cutting edge, comprising a minor cutting edge flank adjoining the minor cutting edge against the direction of rotation, and comprising at least one support element arranged at a distance from the major cutting edge against the feed direction.

The cutting tool according to the invention is rotated during the boring operation relative to a workpiece to be bored in the region of a preformed round hole. In this case it is only the relative rotation between cutting tool and workpiece that is important. When a "rotating cutting tool" is referred to below, the relative rotation is always meant.

The aim of the support element is to radially support the tool on the bore wall inside the bore. Support elements of this type in the form of support strips or crowned support elements are known per se. Such support elements are normally arranged at a distance from the indexable cutting insert on the parent body of the cutting tool (EP-0 586 423 B1). The radius of revolution of the support element there is slightly smaller than the pitch circle radius of the active major cutting edge, such that the support elements first become effective upon boring through when the major cutting edge comes out of the bore during the boring operation and loses its guidance function.

The object of the invention is to improve a rotating cutting tool of the type specified at the beginning to the effect that the support elements already perform a supporting function inside the bore during the boring operation.

To achieve this object, the combination of features specified in claim 1 is proposed. Advantageous configurations and developments of the invention are obtained from the dependent claims.

The solution according to the invention is based on the idea that the support element is not arranged on the parent body as previously but rather is arranged on the cutting insert and has, during the drilling operation, a radius of revolution larger than the pitch circle radius. This is intended to ensure that the tool is already supported during the boring operation, as a result of which the workpiece surface in the region of the bore wall is at the same time smoothed and thus refined. In order to achieve this, it is proposed according to the invention that the minor cutting edge flank has a support part which is arranged at a distance from the minor cutting edge against the direction of rotation and forms one of the support elements and the radius of revolution of which is greater than the pitch circle radius of the active major cutting edge by a projecting size.

A preferred configuration of the invention provides for the minor cutting edge flank to be subdivided into a primary minor cutting edge flank and a secondary minor cutting edge flank by a rounded portion arranged at a distance from the minor cutting edge against the direction of rotation, the support part being arranged in the region of the rounded portion. The support part is advantageously designed to be elongated in the feed direction. It expediently has the outline form of a rectangle elongated in the feed direction or of an elongated triangle. Different outline forms can be produced in particular by different inclinations of the support part relative to the rotation axis. Thus the elongated triangle tapers to a point either in or against the feed direction. The projecting size of the support part is advantageously selected to be <20 µm, preferably <5 µm, whereas the axial distance of the support part from the major cutting edge is preferably 0.01 R to 0.04 R, where R is the pitch circle radius of the major cutting edge.

In a further preferred configuration of the invention, at least two cutting inserts arranged at an equal circumferential distance from one another are provided. Furthermore, it is advantageous if the cutting insert designed as an indexable cutting insert has at least two major cutting edges with the associated support parts. The indexable cutting inserts are fixed in a parent body by means of a clamping or tightening element. The clamping element is in this case expediently designed as a clamping screw.

The measures according to the invention can be realized on indexable cutting inserts which are arranged on the parent body in either a radial horizontal position, radial vertical position or tangential vertical position.

The invention is explained in more detail below with reference to exemplary embodiments schematically shown in the drawing, in which:

DESCRIPTION OF THE DRAWINGS

FIG. 1c shows a two-edged indexable cutting insert for fitting in a parent body according to FIG. 1a in a radial horizontal position or a tangential vertical position;

FIG. 1d shows a diagrammatic illustration of an indexable cutting insert of the boring tool according to FIG. 1a with indicated bore wall and support part of triangular outline;

DETAILED DESCRIPTION OF THE DRAWINGS

Figure 1A:
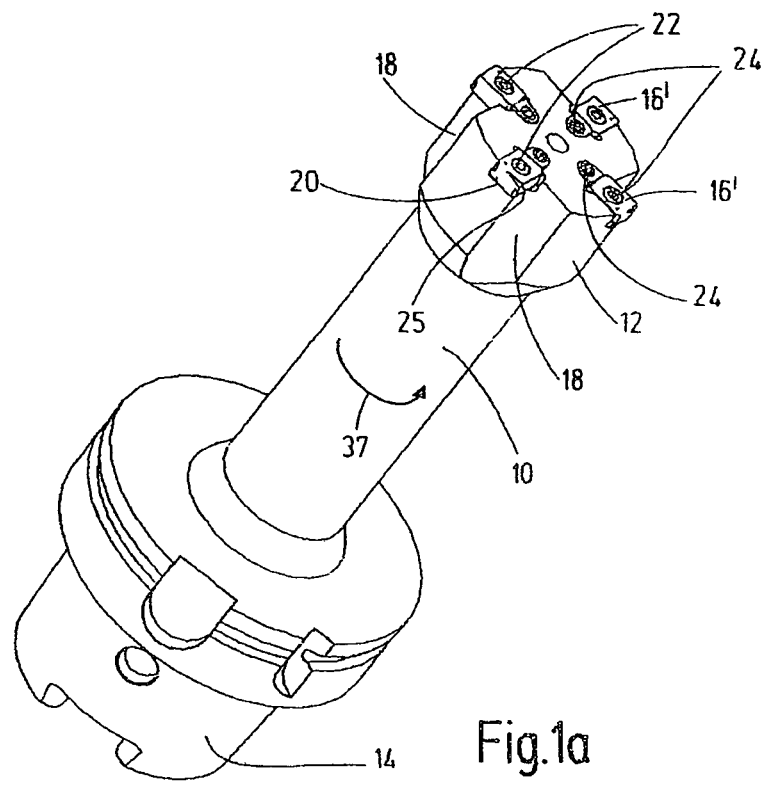
FIG. 1a shows a diagrammatic illustration of a boring tool with four indexable cutting inserts fitted in a radial horizontal position.
Figure 1B:
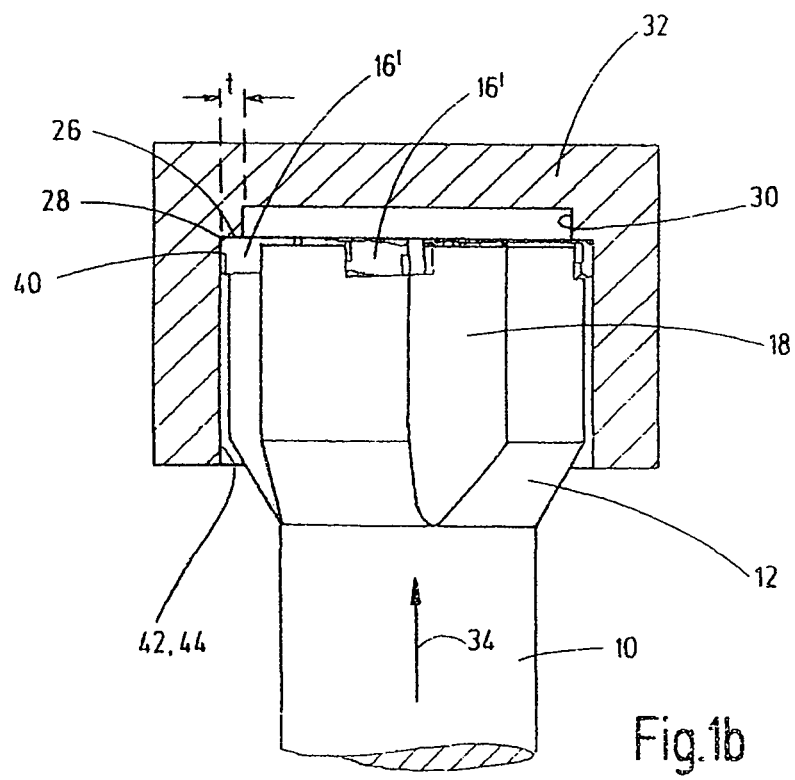
FIG. 1b shows a side view of the boring tool according to FIG. 1a in the course of the boring operation.

The cutting tools shown in the drawing are without exception designed as boring tools which are intended for boring a workpiece in the region of a preformed round hole. The cutting tools essentially comprise a shank 10, a parent body 12 arranged on the front face of the shank, and a coupling element 14 which is arranged on the rear end of the shank 10 and with which the cutting tool can be detachably coupled to a tool spindle of a machine tool. Arranged in each case on the parent body 12 are a plurality of cutting inserts 16', 16", 16'", 16$^{IV}$ which are at a distance from one another, are designed as indexable cutting inserts and project axially and radially beyond the parent body 12 in the region of their active major cutting edges. The flutes 18 adjoining the active major cutting edges and formed in the parent body 12 ensure that the chips produced during the boring operation can be received and discharged against the feed direction 34.

In the exemplary embodiments shown, the cutting inserts are each fixed on the parent body 12 by a clamping screw 22. The embodiments in FIGS. 1 to 4 differ in this case in the shape of the cutting inserts 16', 16", 16'", 16$^{IV}$ and in the way in which they are arranged on and attached to the parent body 12, but do not differ in their function.

In the exemplary embodiment in FIGS. 1a to d, four cutting inserts 16' of rectangular outline are provided, said cutting inserts 16' being inserted into insert seats 20 on the parent body 12 in a radial horizontal position and being fixed to the parent body 12 by means of clamping screws 22 oriented in an axially parallel manner. In addition, an adjusting mechanism 24 for the radial fine adjustment of the cutting inserts 16' in their insert seat 20 is located on each of the insert seats 20.

Figure 2A:
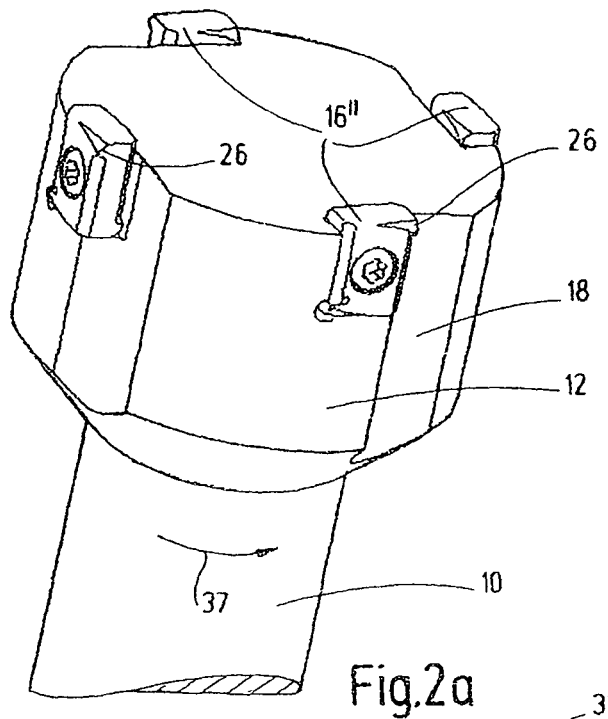
FIG. 2a shows a diagrammatic illustration of a boring tool with four indexable cutting inserts fitted in a tangential vertical position.
Figure 2B:
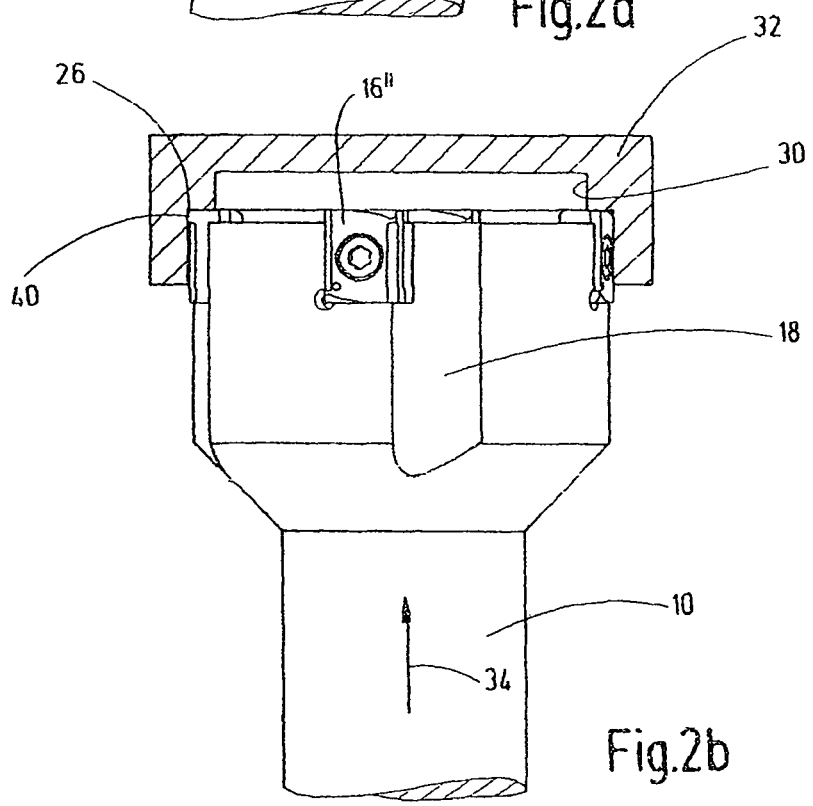
FIG. 2b shows a side view of the boring tool according to FIG. 2a in the course of the boring operation.

In the exemplary embodiment according to FIGS. 2a and b, the cutting inserts 16" of rectangular outline are inserted into their insert seats in a tangential vertical position and are fixed to the parent body 12 by means of radially oriented clamping screws 22.

In the exemplary embodiment according to FIGS. 3a to e, the four cutting inserts 16'" are inserted into their insert seats 20 in a radial vertical position and are fixed to the parent body 12 by means of tangentially oriented clamping screws 22.

Figure 4A:
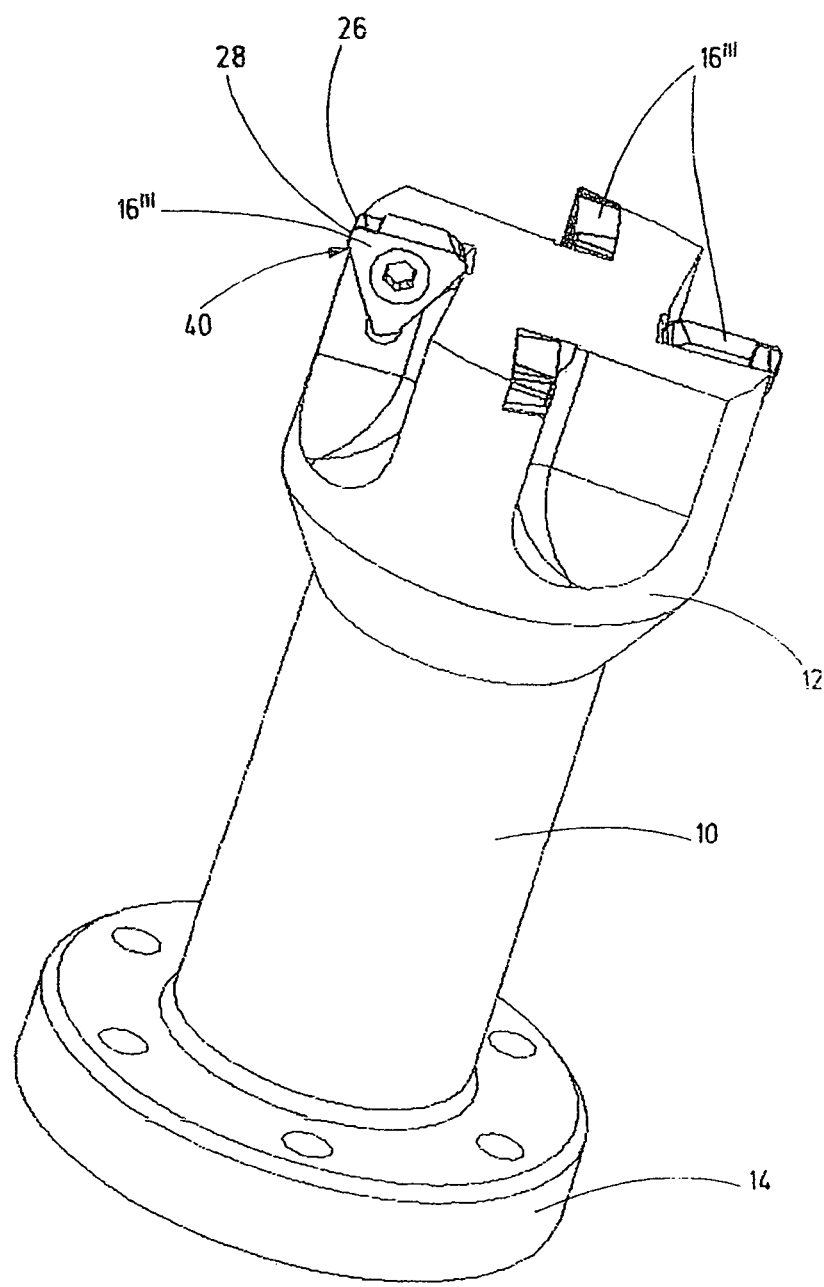
FIG. 4a shows a diagrammatic illustration of a boring tool with three indexable cutting inserts of triangular outline fitted in a radial vertical position.
Figure 4B:
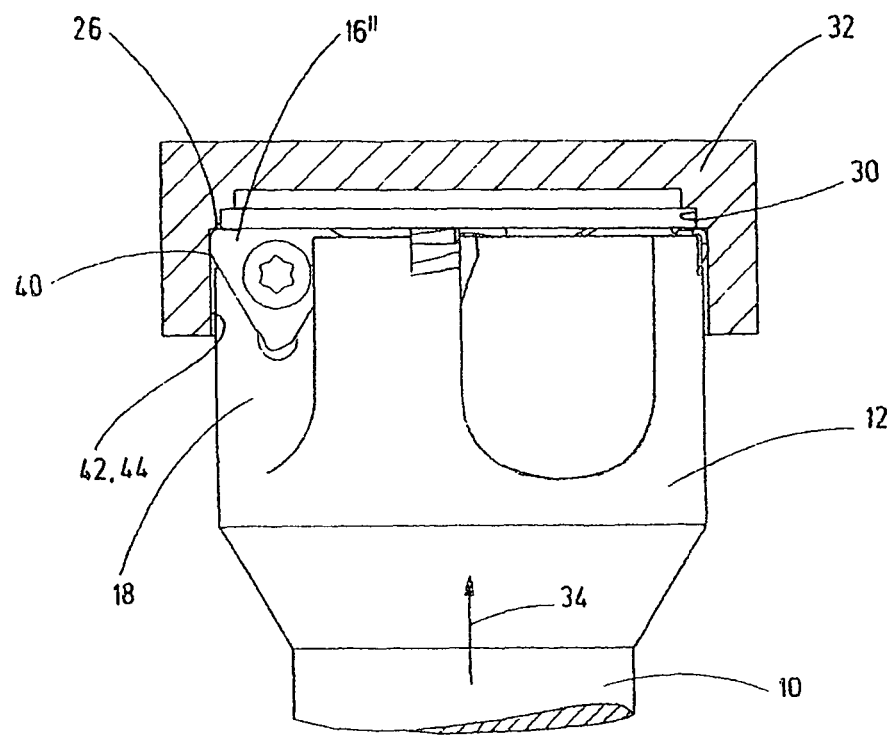
FIG. 4b shows a side view of the boring tool according to FIG. 4a in the course of a boring operation.
Figure 4C:
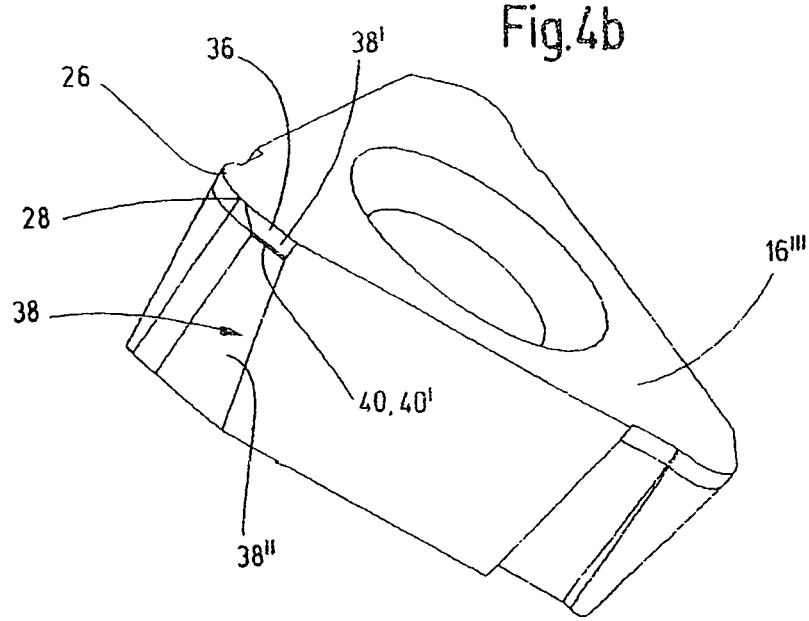
FIG. 4c shows a diagrammatic illustration of the indexable cutting insert of triangular outline according to FIG. 4a and FIG. 4b.

In the exemplary embodiment shown in FIG. 4a, four cutting inserts 16$^{IV}$ of triangular outline are provided, said cutting inserts 16$^{IV}$ being inserted into the associated insert seats 20 in a radial vertical position and being fixed to the parent body by means of tangentially oriented clamping screws 22.

Figure 5:
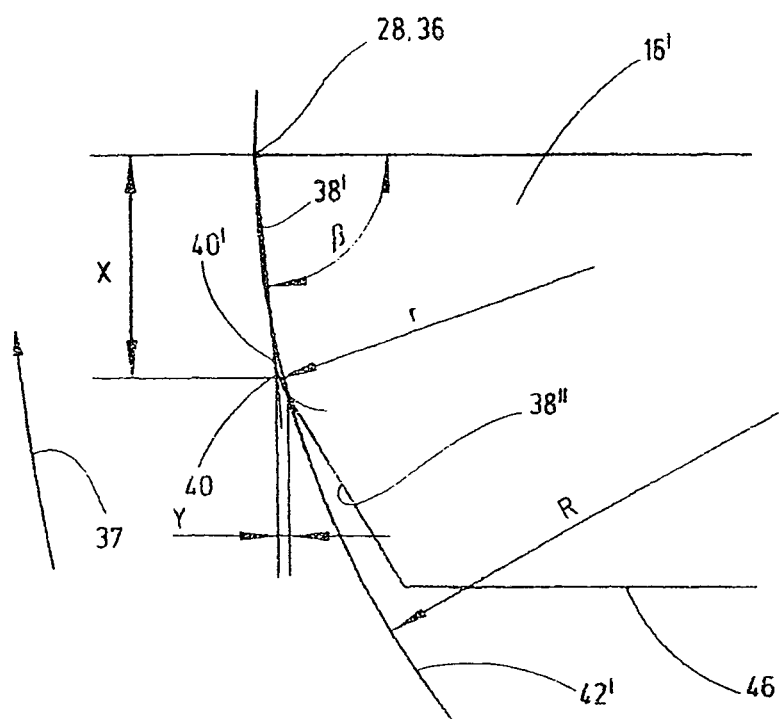
FIG. 5 shows a scheme of the cutting lead geometry in the region of the minor cutting edge and of the minor cutting edge flanks for illustrating the geometrical relationships during the boring operation.

A common feature of all the exemplary embodiments according to FIGS. 1 to 4 is the arrangement of the active major cutting edge 26, which is located in the region of an insert corner 25 in the fitted state of the cutting inserts 16, 16", 16'", 16$^{IV}$ and which defines a pitch circle radius R at its outermost end 28 during the boring operation and penetrates with a predetermined cutting depth t into a workpiece 32 to be machined in the region of a preformed round hole 30. Also provided on the cutting inserts is a minor cutting edge 36 which adjoins the outermost end 28 of the active major cutting edge 26 against a feed direction (arrow 34) and is arranged over its entire length on a smaller radius than the pitch circle radius R of the major cutting edge. A minor cutting edge flank 38 adjoins the minor cutting edge 36 against the direction of rotation 37 and has a support part 40 which is arranged at a distance X from the minor cutting edge 36 against the direction of rotation 37 and the radius of revolution of which is greater than the pitch circle radius of the active major cutting edge by a projecting size Y (FIG. 5). By means of a rounded portion 40' which is arranged at a distance X from the minor cutting edge 36 and has a curvature radius r, the minor cutting edge flank 38 is subdivided into a primary minor cutting edge flank 38' and a secondary minor cutting edge flank 38", the support part 40 being arranged in the region of the rounded portion 40'. The curvature radius r of the rounded portion is expediently selected within the range of 0.01 to 3 mm.

The above-described geometrical relationships of the cutting lead geometry in the region of the minor cutting edge 36 and of the minor cutting edge flank 38 are illustrated in FIG. 5. The geometrical location 42' of the pitch circle with the radius R is also depicted there and corresponds in a workpiece 32 to be bored to the bore 42 with the radius R. It can be seen in FIG. 5 that the support part 40 with the projecting size Y projects beyond the pitch circle 42' and thus leads, during the boring operation inside the bore 42, to support and smoothing of the bore wall 44 produced beforehand by the major cutting edge.

It can be seen with reference to FIGS. 1b, 2b, 3b and 4b how the tool, during the boring operation, penetrates into the workpiece 32 with the active major cutting edges of the cutting inserts 16', 16", 16'", 16$^{IV}$ with a predetermined cutting depth t in the region of a preformed round hole 30 and widens the round hole 30 in the process by the size of the cutting depth to the radius R.

Figure 3A:
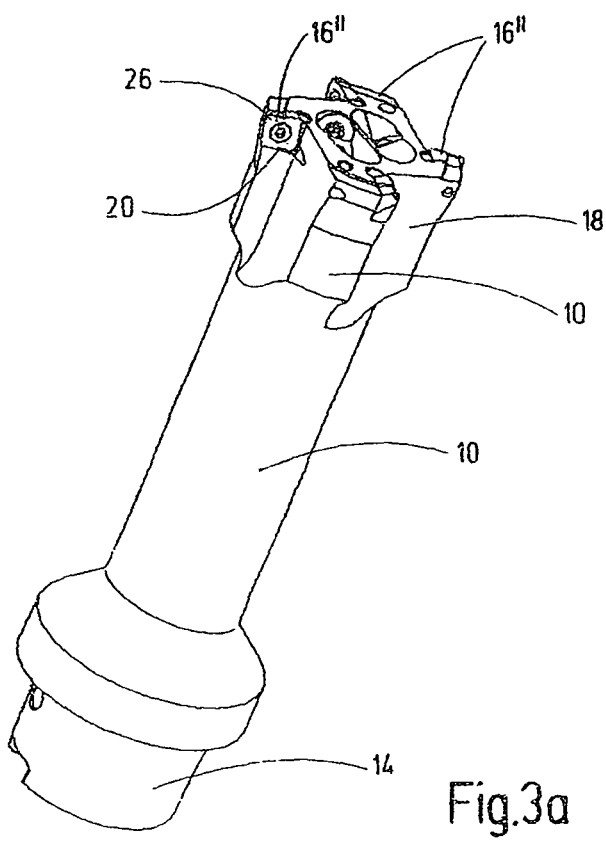
FIG. 3a shows a diagrammatic illustration of a boring tool with four indexable cutting inserts fitted in a radial vertical position.
Figure 3B:
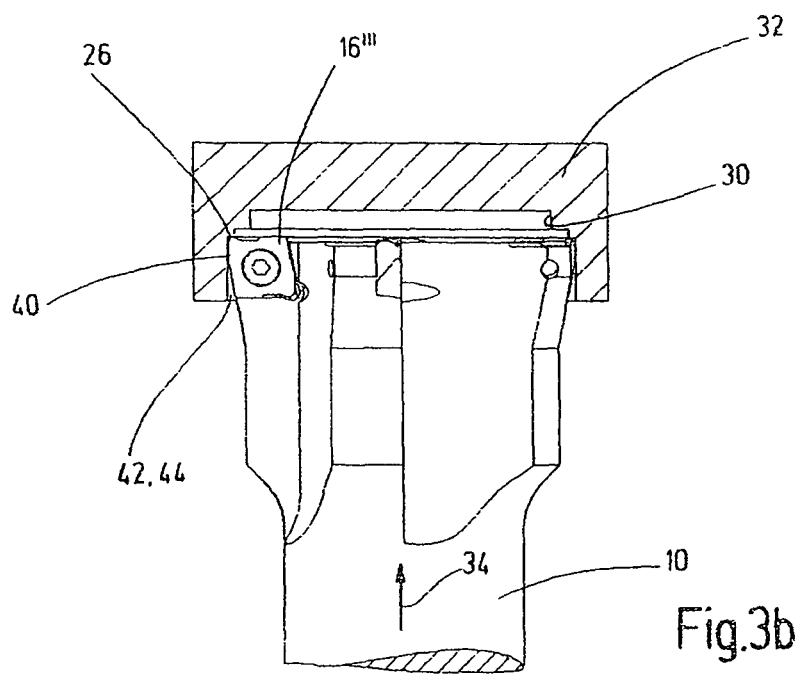
FIG. 3b shows a side view of the boring tool according to FIG. 3a in the course of a boring operation.
Figure 3C:
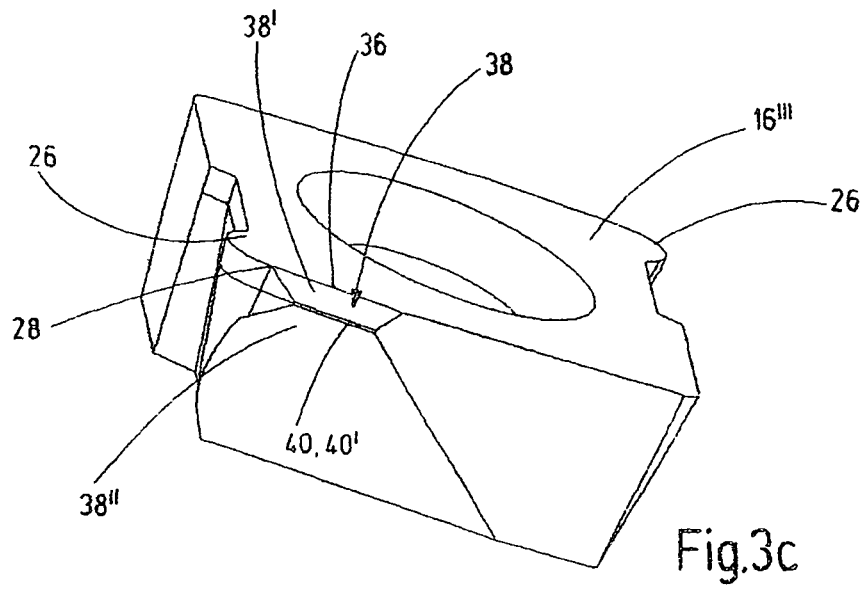
FIG. 3c shows a diagrammatic illustration of an indexable cutting insert of the boring tool according to FIGS. 3a and 3b.
Figure 3D:
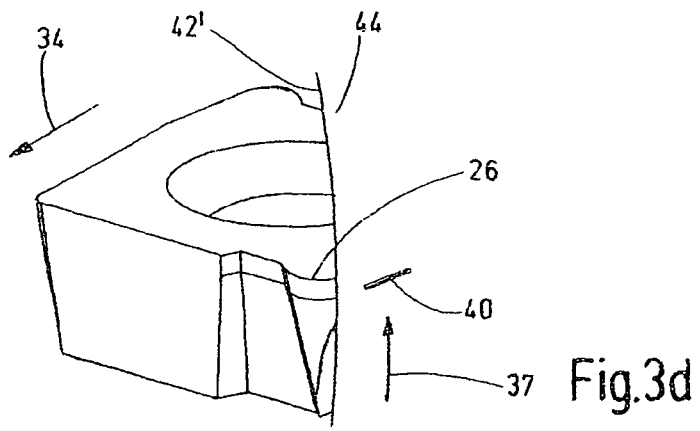
FIG. 3d shows a diagrammatic illustration of the indexable cutting insert according to FIG. 3a with indicated bore wall and support part of elongated rectangular outline.
Figure 3E:
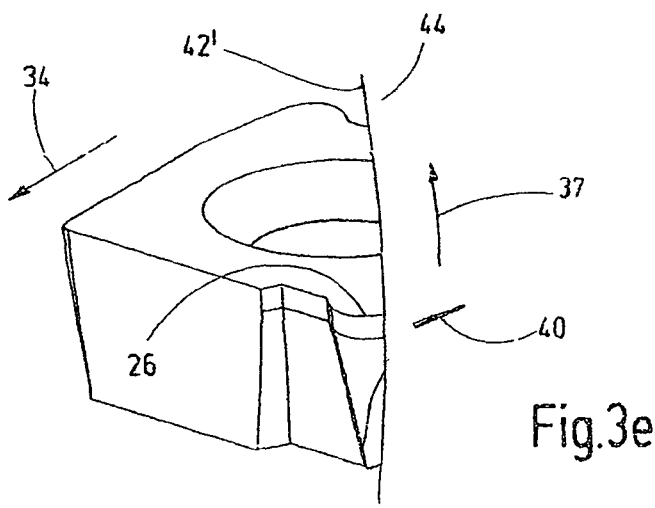
FIG. 3e shows an illustration corresponding to FIG. 3d with support part of triangular outline.

Furthermore, it is indicated in FIG. 1d and in FIGS. 3d and e how the cutting inserts 16', 16'" of the relevant cutting tools are supported with the support parts 40 on the bore inner surface and lead in this region to elastic deformation and smoothing of the bore wall 44. Depending on the setting of the relevant cutting edge 16', 16'" with respect to the axis of rotation, the support parts 40 projecting beyond the pitch circle radius R have the outline form of a rectangle (FIG. 3d) or triangle (FIG. 1d and FIG. 3d) elongated in the feed direction. The elongated triangle tapers to a point in the feed direction 34 in the case of FIG. 1d and against the feed direction in the case of FIG. 3e. The projecting size Y of the support part is selected in such a way that the friction remains low and smoothing of the bore wall 44 is possible without scoring. This is achieved if the projecting size Y is smaller than 5 μm The distance X, measured in the circumferential direction, of the support part 40 from the minor cutting edge 36 is about 0.01 R to 0.04 R, where R is the pitch circle radius of the major cutting edge 26. In the exemplary embodiments according to FIGS. 1 to 3, the cutting inserts 16', 16", 16'" are designed as indexable cutting inserts having two major cutting edges 26 each and the associated support parts 40, whereas in the case of FIG. 4 triangular indexable cutting inserts 16$^{IV}$ having three major cutting edges 26 and the associated support parts 40 are provided. The base surface 46 and the non-active flanks serve to support the indexable cutting inserts in the associated insert seats 20 or in insert cassettes (not shown) for fixing and stabilizing in the parent body 12.

In summary, the following should be noted: the invention relates to a rotating cutting tool, in particular a boring tool for use in machine tools. The cutting tool comprises at least one cutting insert 16' which is designed as an indexable cutting insert and which has an active major cutting edge 26 which is arranged in the region of an insert corner 25, defines a pitch circle radius R at its outer end during rotary use and penetrates with a predetermined cutting depth t into a workpiece 32 in the region of a preformed round hole 30. Also provided is a minor cutting edge 36 which adjoins the outermost end 28 of the major cutting edge 26 against a feed direction 34 and is arranged over its entire length on a smaller radius than the pitch circle radius R of the major cutting edge 26, and adjoining which against the direction of rotation 37 is a minor cutting edge flank 38. A special feature of the invention consists in the fact that the minor cutting edge flank 38 has a support part 40 which is arranged at a distance from the minor cutting edge 36 and the radius of revolution of which is greater than the pitch circle radius R of the active major cutting edge 26 by a projecting size Y.

The invention claimed is:

1. A rotating cutting tool for use in machine tools, comprising at least one cutting insert ($16'$, $16''$, $16'''$, $16^{IV}$) designed as an indexable cutting insert, comprising an active major cutting edge (26) which is arranged in the region of an insert corner (25) of the cutting insert, defines a pitch circle radius (R) at its outermost end (28) during rotary use and penetrates with a predetermined cutting depth (t) into a workpiece (32) in the region of a preformed round hole (30), comprising a minor cutting edge (36) which adjoins the outermost end (28) of the major cutting edge (26) against a feed direction (34) and is arranged over its entire length on a smaller radius than the pitch circle radius (R) of the major cutting edge (26), comprising a minor cutting edge flank (38) adjoining the minor cutting edge (36) against the direction of rotation (37), and comprising at least one support element arranged at a distance from the major cutting edge (26) against the feed direction (34), characterized in that the minor cutting edge, flank (38) has a support part (40) which is arranged at a distance from the minor cutting edge (36) against the direction of rotation (37) and forms at least one support element and the radius of revolution of which is greater than the pitch circle radius (R) of the active major cutting edge (26) by a projecting size (Y).

2. The cutting tool as claimed in claim 1, characterized in that the minor cutting edge flank (38) is subdivided into a primary minor cutting edge flank ($38'$) and a secondary minor cutting edge flank ($38''$) by a rounded portion ($40'$) arranged at a distance from the minor cutting edge (36) against the direction of rotation (37), the support part (40) being arranged in the region of the rounded portion ($40'$).

3. The cutting tool as claimed in claim 1, characterized in that the support part (40) is elongated in the feed direction (34).

4. The cutting tool as claimed in claim 1, characterized in that the support part (40) has the outline form of a rectangle elongated in the feed direction (34) or of an elongated triangle.

5. The cutting tool as claimed in claim 4, characterized in that the elongated triangle tapers to a point in or against the feed direction (34).

6. The cutting tool as claimed in claim 1, characterized in that the projecting size (Y) of the support part (40) is <20 μm, preferably <5 μm.

7. The cutting tool as claimed in claim 1, characterized in that the distance (X), measured in the circumferential direction, of the support part (40) from the minor cutting edge is 0.01 R to 0.04 R, where R is the pitch circle radius of the major cutting edge (26).

8. The cutting tool as claimed in claim 1, characterized in that at least two cutting inserts ($16'$; $16''$, $16'''$, $16^{IV}$) arranged at an equal circumferential distance from one another are provided.

9. The cutting tool as claimed in claim 1, characterized in that the cutting inserts designed as indexable cutting inserts have at least two major cutting edges (26) with the associated support parts (40).

10. The cutting tool as claimed in claim 1, characterized in that the indexable cutting inserts are each fixed in the parent body (12) by means of a clamping or tightening element (22).

11. The cutting tool as claimed in claim 10, characterized in that the clamping element is designed as a clamping screw (22).

12. The cutting tool as claimed in claim 1, characterized in that the indexable cutting inserts ($16'$; $16''$, $16'''$, $16^{IV}$) are arranged on the parent body (12) in a radial horizontal position, radial vertical position or tangential vertical position.

\* \* \* \* \*